Figure 1:
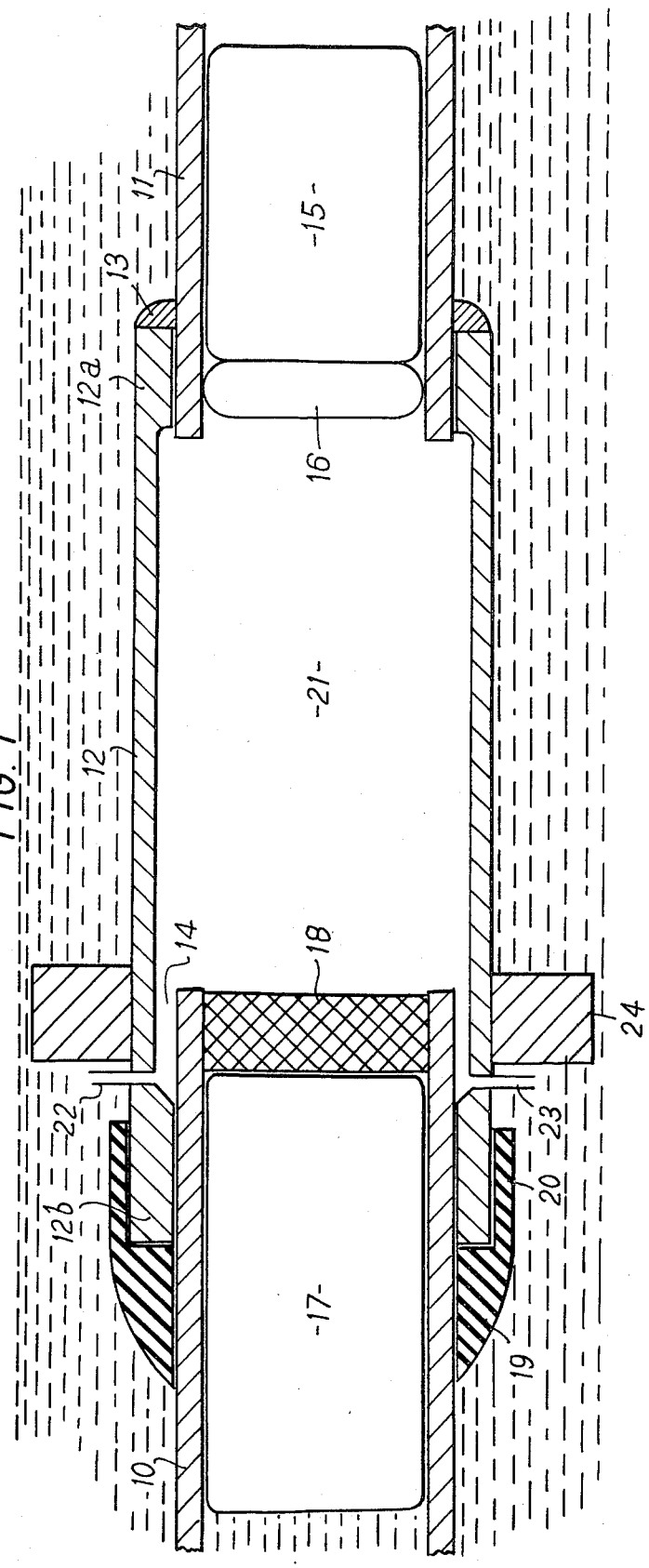

United States Patent [19]
Chadwick et al.

[11] 3,900,148
[45] Aug. 19, 1975

[54] EXPLOSIVE WELDING OF SUBMERGED PIPES

[75] Inventors: Michael Dickenson Chadwick; Peter Woodall Jackson; Derek James Brown, all of Newcastle-upon-Tyne, England

[73] Assignee: International Research and Development Company Limited, Newcastle-upon-Tyne, England

[22] Filed: June 19, 1973

[21] Appl. No.: 371,509

[30] Foreign Application Priority Data
June 21, 1972  United Kingdom................ 29128/72

[52] U.S. Cl. ............................................... 228/107
[51] Int. Cl. ............................................. B23k 27/00
[58] Field of Search ......... 138/89, 93, 97; 29/157.4, 29/190, 401.5, 401.6, 421 E, 470.1, 470.2, 474.3, 479, 497.5, 523

[56] References Cited
UNITED STATES PATENTS
1,839,322   1/1932   Lawrence ....................... 138/93 X
2,908,248   10/1959  Brant ............................... 138/97 X
3,290,770   12/1966  Silverman et al. ................... 29/523
3,377,694   4/1968   Simons et al. .................... 29/470.2

FOREIGN PATENTS OR APPLICATIONS
1,297,708   11/1972  United Kingdom................ 29/470.1

*Primary Examiner*—Gerald A. Dost
*Attorney, Agent, or Firm*—Kemon, Palmer & Estabrook

[57] ABSTRACT

For jointing a tubular member such as a flange-carrying device or a length of pipe to the end of a submerged pipeline, explosive jointing is used. The annular space between the tubular member and the end of the pipeline is closed off by internal and external seals, cleared of sea water, flushed and dried before the jointing charge is detonated, thus facilitating jointing and avoiding contamination of the weld. The bores of the pipeline and tubular member are filled with inflatable bags or other water-displacing members to absorb the shock of the explosion.

7 Claims, 2 Drawing Figures

EXPLOSIVE WELDING OF SUBMERGED PIPES

The present invention relates to the use of explosive welding on pipes which are submerged in a liquid, for example, for underwater pipelines. The invention is applicable to the joining of two pipes directly where the end of one pipe is formed to receive the end of the other and to the attachment of a coupling sleeve or flange to the end of a pipe to facilitate its attachment to another pipe or to an underwater device or installation. For example, the invention may be used for the repair of an underwater pipeline by removing a damaged section and inserting a new section. One way of achieving this is to employ the invention to attach coupling flanges to the ends left free after removal of the damaged section and then secure the replacement section to the coupling flanges by coventional pipe-coupling techniques. It is already known that explosvely-formed joints may be of two kinds, a simple expansion joint or an explosive weld, depending upon the nature and magnitude of the explosive charge and the arrangement of the parts prior to the explosion.

In accordance with the invention there is provided a method of forming an explosively-welded joint between first and second tubular members submerged in a liquid wherein the end of the first member is arranged inside the end of the second member with an annular space between them, an explosive charge disposed within the end of the first member, shock-absorbing elements disposed in the bores of the two members on opposite sides of the explosive charge to displace liquid from at least part of the length of each bore, and with internal and external seals arranged to form a sealed enclosure comprising at least the said annular space, the liquid is then displaced from the enclosure by a gaseous medium, and the explosive charge is detonated to effect welding of the ends of the tubular members.

The internal seal may be disposed within the bore of the second tubular member whereby the said enclosure includes a space within the bore of the second member in addition to the said annular space.

Alternatively, the internal seal is formed between the end of the first member and the inner surface of the second member.

The shock-absorbing elements are preferably inflatable bags. It is also possible to use foam material especially in the case when the second member is relatively short and consists for example merely of a coupling flange with a sleeve which fits over and is welded to the end of the first member.

The explosive charge itself is preferably carried by an inflatable body which ensures close contact of the charge with the inner surface of the first member. The second member is preferably supported externally by a segmented clamp which is positioned around the region in which the explosive welding takes place.

Figure 2:
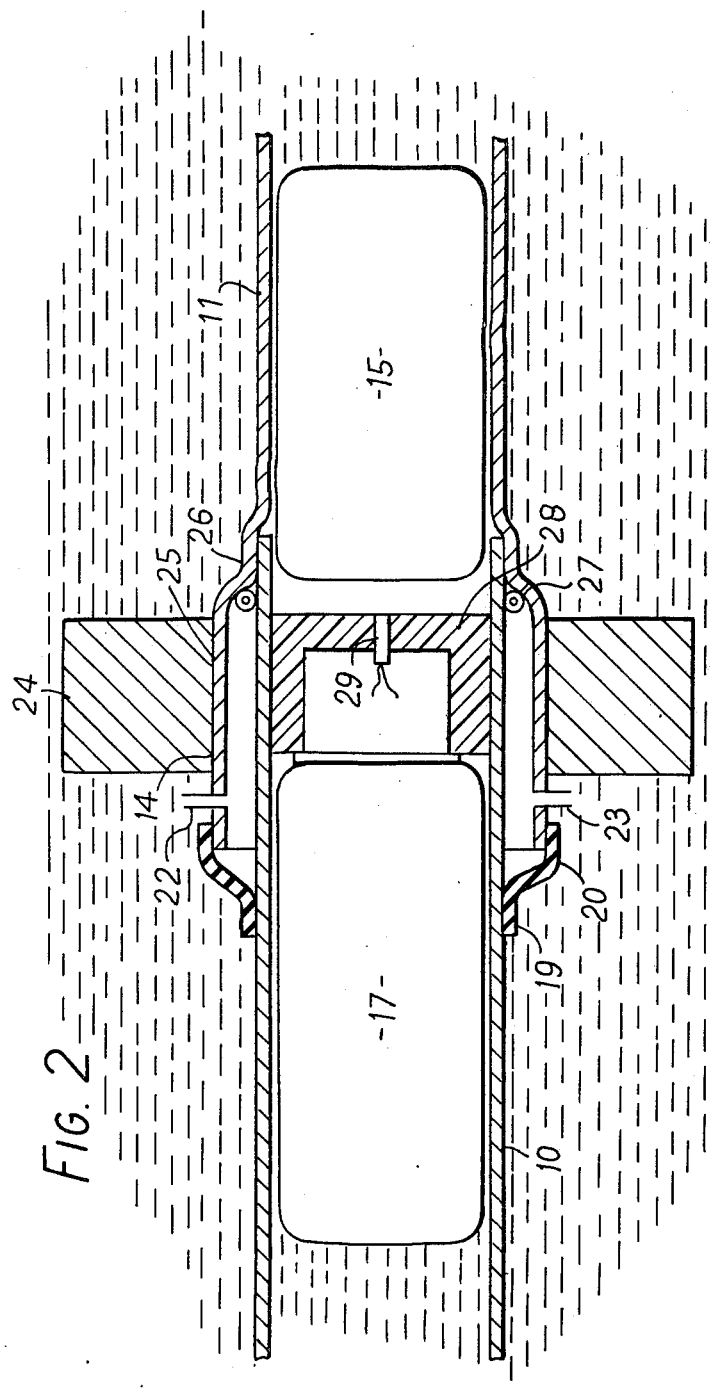

The invention will now be described in more detail with the aid of examples illustrated in the accompanying drawings, in which:

FIG. 1 is a schematic cross-section of an assembly for welding together two pipes by the use of a method in accordance with the invention, FIG. 2 is a similar cross-section of an assembly for welding together two pipes by the use of a second method in accordance with the invention.

Referring first to FIG. 1, this shows two metal pipes 10 and 11 which are to be joined together. A metal sleeve member 12 has at one end a portion 12a of reduced internal diameter which pipe fits closely over the pipe 11 and is welded thereto with a weld fillet 13. The welding of the sleeve portion 12a to the pipe 11 is effected in air before the pipe line is laid on the sea-bed. Fusion welding may be employed, as shown, or alternatively, explosive welding may be used.

At the opposite end of the sleeve member 12 there is a portion 12b, of reduced internal diameter, which fits closely over the pipe 10. The end of the pipe 10 extends into the larger-diameter central portion of the sleeve member 12, an annular space 14 being formed between the end of the pipe and the central portion of the sleeve. The internal surface of the sleeve 12 and the outer surface of the pipe 10 are abraded in the region where they overlap.

The bore of the pipe 11 contains an inflatable water displacement bag 15 and an inflatable sealing bag 16, both of which are inserted and inflated before the pipe 10 is inserted in the sleeve 12. A similar inflatable water displacement bag 17 is inserted in the end of the pipe 10 together with an inflatable body 18 which carries an explosive charge and which serves to seal the end of the pipe 10. The insertion and inflation of the bag 17 and body 18 can be effected in air before the pipe 10 is inserted into the sleeve 12 on the sea-bed. The body 18 carrying the explosive charge is positioned in the end of the pipe 10 in the region surrounded by the space 14 but is set back from the extreme end of the pipe to minimise entry of the products of the explosion into the space 14.

The inflatable body 18 which carries the explosive charge is of the type described in British patent specification No. 1,297,708 which consists of a container made of a shock-wave-transmitting medium, such as rubber, the walls of which contain an explosive charge, together with a detonator and priming charge. The body is inserted in the bore of the pipe 10 and then inflated into contact with the internal surface of the pipe. The leads for the detonator may pass through a plug in the wall of the sleeve 12 which is sealed upon detonation of the explosive or else they may be brought out through the bore of the pipe 10. Alternatively, the leads may be connected through a remotely-operable switching device to a battery which will supply sufficient current for operation of the detonator. The switching device can be operated from outside the pipes 10 and 11 and sleeve member 12 by means of a magnetic field generated by an electrical winding or by means of a sonar generator.

On the outside of the pipe 10 is a hard rubber sealing ring 19 having a more flexible flap portion 20. The ring 19 is initially placed on the pipe 10 with the flap portion 20 rolled back. When the pipe 10 is inserted in the sleeve 12, the flap is unrolled over the end of the sleeve protion 12b to form an external seal preventing the entry of water to the space 14 and to the space 21 within the sleeve 12 which is closed at one end by the sealing bag 16 in the pipe 11 and at the other end by the inflated body 18 in the pipe 10.

Inlet and outlet ducts 22 and 23, respectively, pass through the sleeve 12 into the space 14 immediately adjacent the end portion 12b of the sleeve. The inlet and outlet ducts 22 and 23 are connected by flexible hoses (not shown) to valve and pumping apparatus located above the body of water in which the pipes are submerged. To remove water from the spaces 14 and 21, clean air or nitrogen is supplied to the inlet duct 22 at a pressure slightly greater than the hydrostatic pressure prevailing within the sleeve 12. The water in the sleeve 12 is thus displaced and forced out through the outlet duct 23. To avoid the deposit of dissolved salts which, especially in the case of sea water, would occur if the interior of the sleeve 12 were dried directly, the spaces 12 and 21 are then flushed with fresh water. The fresh water is displaced by air or nitrogen followed by a solvent such as methylated spirits which removes all residual water. The spaces 14 and 21 are finally again flushed with air or nitrogen which is dried to reduce the concentration of water vapour to as low a level as is desired, using apparatus such as a Draeger tube to measure the residual concentration.

A segmented clamp 24 is placed around the sleeve 12, in the region of the body 18 carrying the explosive charge, in order to support the sleeve against the force of the explosion. The clamp 24 consists essentially of a number of metal segments held around the sleeve 12 by a clamping band or the like which is releasable after completion of the weld. After the removal of water from the spaces 14 and 21, as described above, the explosive charge is detonated to expand the end of the pipe 10 into engagement with the sleeve 12 to form a weld between them. During welding the part of the pipe 10 projecting beyond the body 18 carrying the charge shields the weld region from the products of the explosion and thus prevents contamination. The formation of the weld separates the inlet and outlet ducts 22 and 23 from the space 21 within the sleeve 12 and thus ensures a watertight connection between the pipes 10 and 11.

In the embodiment of FIG. 2 parts corresponding to those of FIG. 1 are given the same reference numerals and will not be further described. In the place of the sleeve 12 the pipe 11 is itself formed with a larger-diameter end portion 25 which surrounds the end of the pipe 10, forming the annular space 14 which is inclosed as before by an external seal 19 with a flap 20. The inner end of the pipe 10 is, however, advanced to engage a step 26 in the pipe 11 and an inflatable seal 27 is located between the end of the pipe 10 and the inner surface of the end portion 25 of the pipe 11. The seal 27 forms an internal seal which closes the space 14. The removal of water, flushing and drying by way of ducts 22 and 23 now only affects the space 14 which is in the immediate region of the weld and the necessity of treating the large space 21 within the sleeve is avoided. Higher gas pressures and flushing rates can be used in treating the space 14. An inflatable body 28 carrying the explosive charge is located in the end of the tube 10. The drawing shows a detonator 29 carried by the body 28. The inflatable bags 15 and 17 are placed as close as possible to the body 28 to displace water from the region of the explosion.

With the arrangement of FIG. 2 it is convenient if the end of the submerged pipeline is the pipe 10. The inflatable bag 17 and charge-carrying body 28 have then to be inserted in the end of the pipe and the other parts of the assembly fitted round it. The water-displacement bags 15 and 17 serve as before to absorb the shock wave when the explosive is detonated and thus prevent any bulging of the pipe walls. On completion of the weld the bags 15 and 17 and the remains of the explosive charge can be flushed out of the pipe by known means.

It will be appreciated that in each of the embodiments described it is possible to use alternative forms of seal. For example, the external seal may be of the inflatable type. The explosive charge need not be carried by an inflatable body provided that it is positioned close to the inner surface of the pipe in which it is located.

The method described may be applied to the welding of a number of joints in sequence. It may be used to attach a sleeve member carrying a flange to a pipe. For replacement of a damaged section of pipe, a flange may be welded to each of the free ends left after removal of the damaged section and a new section can then be mounted between the flanges by conventional pipe-coupling methods.

We claim:

1. A method of explosively forming a joint between first and second tubular members submerged in a liquid comprising the steps of, assembling one end of the first member, one end of the second member, shock absorbing elements, internal and external seals and an explosive charge to form a jointing assembly, and thereafter detonating the explosive charge to effect jointing of the said ends of the tubular members, wherein the said assembling step includes the following steps carried out in any operative order, a. arranging the said one end of the first member inside the said one end of the second member, b. disposing an explosive charge within the said end of the first member, c. disposing shock-absorbing elements in the bores of the two members on opposite sides of the explosive charge, d. arranging internal and external seals to form a sealed enclosure comprising at least the space between said ends, and e. displacing liquid from the said enclosure and replacing it with a gaseous medium.

2. A method as claimed in claim 1, wherein said internal seal is disposed in the bore of the second tubular member whereby the said enclosure includes a space within the bore of the second member in addition to the said space between said ends 3. A method as claimed in claim 2, wherein said displacement of liquid from said enclosure comprises the steps of introducing a displacing fluid through a vent in the end of the second member located beyond the region to be jointed and thereby causing the liquid to flow from a further vent in the second member located beyond the region to be jointed, and wherein said jointed step separates said vents from the said space within the bore of the said second member.

4. A method as claimed in claim 1, wherein said internal seal is arranged between the said end of the first member and the internal surface of the second member.

5. A method as claimed in claim 4 wherein said liquid-displacing step comprises forcing a gaseous medium under pressure into said annular space through a first vent and thereby expelling the liquid from a second vent and wherein said explosive jointing forms a weld ring between said vents and said internal seal.

6. A method as claimed in claim 1 in which the shock-absorbing elements are inflatable bags which fill the cross section of the bore in which they are located.

7. A method as claimed in claim 1, in which the explosive charge is carried by an inflatable body.

* * * * *